United States Patent Office 2,983,712
Patented May 9, 1961

2,983,712

POLYMERS OF ACRYLONITRILE

William K. Wilkinson, Waynesboro, Va., assignor to E. I. du Pont de Nemours and Company, Wilmington, Del., a corporation of Delaware No Drawing. Filed Mar. 31, 1958, Ser. No. 724,813

14 Claims. (Cl. 260—79.3)

This invention relates to a new class of polymerizable organic compositions and polymers prepared therefrom. More particularly, this invention relates to sulfonated vinyl monomers and polymerization products containing said monomers.

In preparing polymerization products, it is frequently desired to copolymerize two or more monomers, each having a separate function in the final product. For example, in the textile fiber field, it has been found to be desirable to combine acrylonitrile, well known for its good fiber-forming qualities, with a small amount of a monomer capable of introducing dye sites into the resultant fiber. Among the preferred materials are the anionically modified compositions, particularly those containing strong anion groups such as sulfonic acid or sulfonate salt groups capable of attracting basic dyes which are characterized by having cationic groups within their structure. Generally, hydrophilic monomers are used to introduce these strongly anionic groups into the fiber-forming composition. However, one disadvantage of the known hydrophilic monomers is that they do not, as a class, polymerize readily with the monomers of the fiber-forming composition and, more particularly, they do not polymerize at the same rate as the monomers of the fiber-forming composition. As a result, it is extremely difficult to obtain a final product which contains the desired proportion of monomer and has the resultant desirable dyeing qualities.

It is, therefore, an object of this invention to provide polymerizable hydrophilic vinyl monomers containing sulfonate groups which are readily polymerizable with hydrophobic fiber-forming materials and have a polymerization rate comparable to that of the said fiber-forming materials.

It is another object of this invention to provide fiber-forming polymers containing polymerizable sulfonated vinyl monomers in which the dominant component is acrylonitrile.

A further object is to provide a process for preparing fiber-forming polymers containing at least 85% acrylonitrile which have enhanced dyeability due to the presence therein of strongly anionic sulfonate groups.

The above and other objects are attained by the preparation of a monomer containing an acrylamido group linked through nitrogen and a sulfonate group linked through sulfur to an organic residue which separates the nitrogen and sulfur by at least two (2) carbon atoms. The monomers may be represented by the formula $$CH_2=\overset{R}{\underset{|}{C}}CONHR'(SO_3X)_n$$

where R is selected from the group consisting of hydrogen, a lower alkyl radical containing from 1 to 4 carbon atoms, nitrile, and halogen; R' is an aliphatic or aromatic hydrocarbon residue having at least 2 carbon atoms separating N from S; X is a monovalent cation selected from the group consisting of hydrogen, ammonium, an organic amine, and an alkali metal; and n is an integer from 1 to 3. The fiber-forming copolymers provided by this invention are comprised of at least 85% acrylonitrile, 2% to 14% of a copolymerizable ethylenically unsaturated monomer and from about 0.1% to 10% of the sulfonated vinyl monomer of this invention. Preferably the copolymers of this invention contain from about 0.3% to 6.0% of the sulfonated vinyl monomer of the present invention.

The monomers of this invention are readily prepared by reacting acrylyl chloride or the proper substituted acrylyl chloride with a compound having a primary amine and one or more sulfonic acid or sulfonate salt groups, the latter being separated from the amine by at least 2 carbon atoms. The copolymerization of the monomers of this invention with acrylonitrile and other monomers disclosed herein may be achieved by known general methods, for instance by heating the components together in a common solvent, e.g., water, dimethylformamide, benzene, heptane, etc., in the presence of an initiator.

The invention will be further described in conjunction with the following specific examples in which proportions are given in parts by weight unless otherwise specified. The examples are merely illustrative, and it is not intended that the scope of the invention be restricted to the details set forth therein.

Example I

Sodium p-methacrylamidobenzenesulfonate is prepared using the following recipe:

17.3 parts of para-aminobenzenesulfonic acid (sulfanilic acid [0.1 mol])
10.6 parts of sodium carbonate (0.1 mol)
150 parts of water
0.1 part of hydroquinone
10.5 parts of methacrylyl chloride (0.1 mol)

The sulfanilic acid, sodium carbonate, water, and hydroquinone inhibitor are slurried together at 10° C., and the acid chloride is then added dropwise with exclusion of air. The resultant slurry is then added to 4 volumes of acetone, with stirring, and the solid material is filtered off and dried under vacuum. The desired product is removed from this salt mixture by extraction with hot methanol, from which it recrystallizes on cooling. After four recrystallizations from methanol, the desired sodium p-methacrylamido-benzenesulfonate is obtained in pure form. It shows the following chemical groups according to infrared absorption analysis:

| IR Absorption Band, Microns | Chemical Group |
|---|---|
| 6.00 | Acid amide carbonyl. |
| 6.12 | Ethylene unsaturation. |
| 6.24 | Anilino-phenyl. |
| 6.55 | Monosubstituted amide. |
| 6.67 | Anilino-phenyl. |
| 9.90 | Aromatic sulfonate. |

Elemental analysis of the monomer shows the following:

| Element | Calculated for $C_{10}H_{10}O_4NSNa$ | Found |
|---|---|---|
| Carbon | 45.62 | 46.30 |
| Hydrogen | 3.83 | 3.80 |
| Oxygen | 24.31 | 24.68 |
| Nitrogen | 5.32 | 5.11 |
| Sulfur | 12.18 | 11.82 |
| Sodium | 8.73 | 8.29 |

Example II

A homopolymer of sodium p-acrylamido-benzenesulfonate is prepared using the following procedure.

Example I is repeated except that acrylyl chloride (9.1 grams, or 0.1 mol) is used in place of methacrylyl chloride. To the crude reaction mixture is added 5% of hydrogen peroxide based on the theoretical yield of monomer, and this mass is then heated to dryness at 70° C. to 80° C. on a steam bath to polymerize the synthesized monomer, sodium p-acrylamidobenzenesulfonate. The dry residue is dissolved in water and the polymer separated from salts by dialysis. Evaporation of the dialysate produces a film of polymer which is analyzed as follows:

| Element | Calculated for $C_9H_8O_4NSNa$ | Found |
|---|---|---|
| Carbon | 43.37 | 44.02 |
| Hydrogen | 3.23 | 3.30 |
| Oxygen | 25.68 | 26.52 |
| Nitrogen | 5.62 | 5.62 |
| Sulfur | 12.87 | 12.13 |
| Sodium | 9.22 | 8.41 |

In addition, the film shows the following chemical groups according to infrared analysis:

| IR Absorption Band, Microns | Chemical Group |
|---|---|
| 5.98 | Acid amide carbonyl. |
| 6.25 | Anilino-phenyl. |
| 6.54 | Monosubstituted amide. |
| 9.90 | Aromatic sulfonate. |

*Example III*

A terpolymer comprised of acrylonitrile, methyl acrylate and sodium methacrylamidobenzenesulfonate is prepared using the following procedure.

Sodium methacrylamidobenzenesulfonate is prepared and purified as in Example I. The product is a white plate-like crystalline solid soluble in water and methanol, and insoluble in acetone and chloroform. It forms a 2-benzyl-2-thiopseudourea derivative which melts at 208° C. to 210° C., and which derivative has a sulfur content of 15.30% as compared to a calculated value of 15.70%

This monomer is polymerized with an acrylonitrile/methyl acrylate monomer mixture, using the following recipe:

100 parts water
15.0 parts acrylonitrile/methyl acrylate mixture (94/6)
0.15 part sodium methacrylamidobenzenesulfonate
0.0135 part potassium persulfate
0.027 part sodium meta-bisulfite The mixture is polymerized for forty minutes at 48° C., under nitrogen, with agitation. The polymeric product is separated from the reaction mixture by filtration and is washed with water. The yield of product is 76%, and its intrinsic viscosity is 2.19; this corresponds to a weight (average molecular weight) of about 190,000. Analysis of the product shows it to contain 1.0% of the sulfonate monomer.

The following method is used to analyze the polymer for sulfonate monomer content. A 1% solution of polymer in dimethylformamide is passed first through a mixed-bed ion exchange resin and then through a cation exchange resin. An aliquot of the exchanged solution is evaporated to dryness to determine the concentration of polymer in solution, and a second aliquot is titrated with alcoholic potassium hydroxide solution to a color change of neutral red indicator. From the data obtained, the total acidity of the polymer in equivalents per gram is calculated. From this value is subtracted the acidity of a polymer of identical intrinsic viscosity, but made without the addition of the sulfonate-containing monomer. The difference is the acid content introduced by the sulfonate-containing monomer. By proper calculation, this value can be converted to percent of the acid monomer in the polymer.

The polymeric product is dissolved in dimethylformamide and spun into fibers. The fibers, which contain 78 milliequivalents of combined sulfur per kilogram of polymer, exhibit excellent dyeability when dyed with a common basic dye, Crystal Violet (Color Index 681).

*Example IV*

The following recipe is used to prepare sodium p-methacrylamidobenzenesulfonate:

4 parts p-methoxyphenol inhibitor
195 parts sodium sulfanilate
84 parts sodium bicarbonate
105 parts methacrylyl chloride
500 parts water The methoxyphenol, sodium sulfanilate and sodium bicarbonate are dissolved in the water and the methacrylyl chloride is added dropwise with vigorous stirring. The addition requires one hour and the mixture is stirred for an additional fifteen minutes after addition is complete. The solid material which forms is filtered off and dried under vacuum. The filter cake is then stirred into two liters of acetone and again filtered off and air dried. A 63% yield of pale cream-colored dry product is obtained. This product contains 71% of the desired sodium p-methacrylamidobenzenesulfonate plus 21.3% of sodium chloride and 3.1% of polymeric sodium methacrylamidobenzenesulfonate. Infrared analysis shows that the product contains a secondary amide, a para-substituted aromatic sulfonate radical and ethylenic unsaturation.

To a continuous polymerization vessel are fed a mixture of 93.3 parts of acrylonitrile, 6.0 parts of methyl acrylate and 0.7 part of sodium p-methacrylamidobenzenesulfonate. This combination accounts for 30% of the feed to the vessel, a majority of the remainder being water. Also fed into the vessel are 0.4% of potassium persulfate and 0.48% of sulfur dioxide, both based on total monomer feed. The materials are fed into the agitated vessel continuously in the proportions given and the resulting product overflows the reactor at such rate that the residence time within the reactor is sixty minutes. The reactor temperature is held at 45° C. and the pH of the liquid mixture is 2.4. A yield of 80.5% polymer having an intrinsic viscosity of 1.80 is obtained. This product is found by analysis to contain 0.68% of the sulfonate monomer.

The polymeric product is dissolved in dimethylformamide and spun into fibers which contain 61 milli-equivalents of combined sulfur per kilogram of polymer. Dyeability of the fibers is excellent using a basic dye, Crystal Violet (Color Index 681).

*Example V*

Sodium 2-methacrylamidoethanesulfonate is prepared using a recipe consisting of:

4 parts hydroquinone inhibitor
147 parts sodium 2-aminoethanesulfonate (1 mol)
168 parts sodium bicarbonate (2 mols)
105 parts methacrylyl chloride (1 mol)
500 parts water The sodium 2-aminoethanesulfonate, the sodium bicarbonate, and the inhibitor are dissolved in the water, air is replaced by nitrogen, and the methacrylyl chloride is added over a period of one hour, with vigorous agitation, the temperature being kept at 15° C. After fifteen minutes additional stirring, two liters of acetone is added and the solid present is filtered off and dried at room temperature. A portion of the dry solid is analyzed for ethylenic unsaturation by a bromide-bromate titration in aqueous solution. This analysis indicates a 40% yield of sodium-2-methacrylamidoethanesulfonate.

The crude product is copolymerized with acrylonitrile by a continuous procedure. To a stirred vessel, fitted with an overflow line and blanketed with nitrogen gas, ingredients are continuously added in the following proportions:

99.3 parts acrylonitrile
0.7 part 2-methacrylamidoethanesulfonate
233 parts water
0.4 part potassium persulfate
0.7 part sodium meta-bisulfite In addition, a quantity of sulfuric acid, sufficient to maintain the pH at 3.25, is continuously fed in. The reactor contents are maintained at 48° C. and the residence time is eighty minutes.

After four hours of continuous operation, a sample of the effluent product is filtered, washed and dried. It has an intrinsic viscosity of 1.73. Analysis by the procedure given in Example III shows this polymer to contain 0.5% of polymerized sodium 2-methacrylamidoethanesulfonate.

The polymeric product is dissolved in dimethylformamide and spun into fibers which contain 54 milliequivalents of combined sulfur per kilogram of polymer. Dyeability of the fibers is good using a basic dye, Crystal Violet (Color Index 681).

It will be apparent from the foregoing examples that a significant saving of material can be achieved by utilizing the monomers of this invention in preparing copolymers since the sulfonate monomer appears in the final product in substantially the same proportion as that added to the monomeric mixture. It will also be apparent that the polymerization products may be shaped into various filamentary forms such as fibers, ribbons, and films.

The process for preparing the compounds of this invention is in no sense limited to the use of acrylyl chloride or methacrylyl chloride as one of the chief reaction ingredients. The acid chloride may be represented by the formula

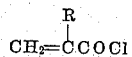

$$CH_2=\overset{R}{\underset{|}{C}}COCl$$

where R is either hydrogen, a lower alkyl radical containing from 1 to 4 carbon atoms, a halide, or a nitrile group.

Likewise, the amino sulfonic acids which are intermediates in the reaction are not limited to the examples given. They may be aliphatic or aromatic amino sulfonic acids. The aliphatic acids must contain 2 or more carbon atoms. In these compounds, the amino and sulfonate groups must be attached to different carbon atoms. The sulfonate is preferably in a salt form, e.g., alkali metal or ammonium sulfate. It may also be a salt of the sulfonic acid with an organic base such as ethylamine, diethylamine, or ethanolamine. The aromatic nucleus to which the amino group and the sulfonate group are attached may be, for example, benzene, biphenyl, naphthalene, anthracene, or the like. Preferably, the hydrocarbon nucleus is ethylene, trimethylene, or ortho-, meta-, or para-phenylene.

The invention also includes compounds having a plurality of sulfonate groups.

Included among the various amino sulfonic acids which may be used are:

$$H_2NCH_2CH_2SO_3Na$$
Sodium 2-aminoethanesulfonate $$H_2NCH_2CH_2CH_2SO_3K$$
Potassium 3-aminopropanesulfonate $$H_2NCH_2CH_2OCH_2CH_2SO_3Na$$
Sodium 2-(2'-aminoethoxy)-ethanesulfonate

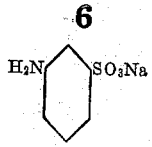

Potassium p-aminobenzenesulfonate

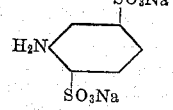

Sodium m-aminobenzenesulfonate

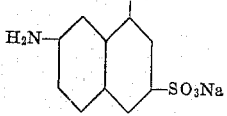

Disodium 1-aminobenzenedisulfonate-2,5

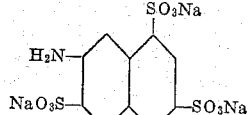

Disodium 2-aminonaphthalenedisulfonate-6,8

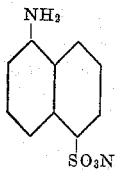

Trisodium 2-aminonaphthalenesulfonate-3,6,8

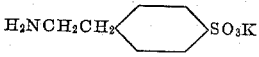

Sodium 1-aminonaphthalenesulfonate-5

Potassium p-(beta-aminoethyl)-benzenesulfonate

Other examples of the sulfonated monomer of the present invention include:

$$CH_2=CHCONHCH_2CH_2SO_3Na$$
Sodium 2-acrylamidoethanesulfonate $$CH_2=CH(CH_3)CONH(CH_2)_3SO_3K$$
Potassium 3-methacrylamidopropanesulfonate

Ammonium p-acrylamidobenzenesulfonate

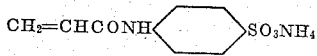

Potassium 6-acrylamidonaphthalenesulfonate-1

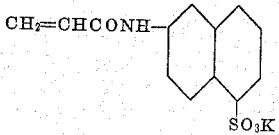

Disodium 4-methacrylamidobenzenedisulfonate-1,3

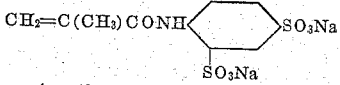

Disodium 4-acrylamidonaphthalenedisulfonate-1,6

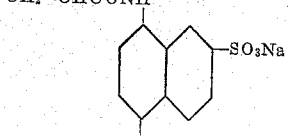

Tripotassium 3-acrylamidonaphthalenetrisulfonate-1,5,6

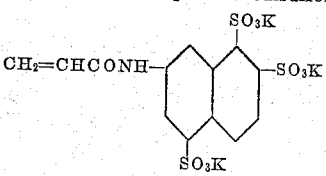

In the class of sulfonated monomers described herein, I prefer those which have a ratio of carbon atoms to sulfonate groups of at least 4:1 and preferably 8:1 or greater for preparing copolymers. I find that the reactivity of the monomers relative to the reactivity of hydrophobic monomers, such as acrylonitrile, increases with this carbon to sulfonate ratio and that the reactivity ratio of the sulfonate monomer and the hydrophobic monomer reaches unity when the carbon to sulfonate ratio of the sulfonate-modified monomer is approximately 8. For reasons of cost and ease of preparation, sodium p-acrylamidobenzenesulfonate and sodium p-methacrylamidobenzenesulfonate are preferred.

As the above examples indicate, the monomers are synthesized by following a relatively simple procedure. The acid chloride is added to the sulfonate amine in the presence of a sufficient quantity of base to react with the hydrochloric acid which is liberated by the reaction. The amino sulfonic acid may be used in its acid form, in which case a sufficient quantity of base must be present to convert the sulfonic acid to its salt form in addition to that quantity required for reaction with hydrogen chloride. If the sulfonic acid is in its salt form, the amount of base used should be from one to four times the amount of the amino sulfonate based on equivalent weight. The base used may, for example, be sodium hydroxide or potassium hydroxide, or preferably sodium or potassium carbonate, or sodium or potassium bicarbonate. The reaction is run at 5° C. to 25° C., and preferably at 10° C. to 15° C. Air is excluded from the reaction mixture, preferably by blanketing the mixture with nitrogen gas.

Shortly after the addition of the acid chloride is complete, the reaction product and byproduct salts will separate from the reaction mixture as a solid. This may be isolated by filtration or the whole mass may be poured into 4 or 5 volumes of acetone and the solid product then separated by filtration. If high product purity is desired, it may be separated from the salts by extraction with hot methanol, and the product which separated from the hot methanol after cooling may be further purified by recrystallization from this solvent.

Polymerization of the monomers and copolymerization of these monomers with hydrophobic monomers such as acrylonitrile may be carried out using the crude aqueous reaction product or by using the purified materials. The polymerization may be initiated by peroxide-type initiators such as hydrogen peroxide or by "Redox" catalyst systems such as the combination of inorganic persulfates with salts of sulfurous acid, sulfurous acid itself, or sulfur dioxide. The techniques of both batch polymerization and continuous polymerization using such catalyst systems are well known in the art.

In the copolymerization reaction, the monomers of my invention may be polymerized with one or more non-ionic copolymerizable ethylenically unsaturated monomers, e.g., vinyl acetate, methyl vinyl ketone, methyl methacrylate, dimethyl itaconate, butyl methacrylate, butyl acrylate, diethyl maleate, vinyl trimethyl acetate, methacrylonitrile, styrene, vinyl chloride, methacrylamide, acrylyl chloride, butadiene, chloroprene, vinyl pyridine, vinyl imidazol, vinyl oxyethyl formamide, divinyl benzene, methylene bisacrylamide, vinylidene cyanide, and other monomers set forth in Jacobson U.S. Patent No. 2,436,926.

Of particular interest are the copolymers of the monomers of my invention with acrylonitrile in which the monomers of the present invention are present to the extent of about 0.1% to 10.0%, and the terpolymers of my monomers with acrylonitrile and any of the above-defined monomers. In these terpolymers, acrylonitrile is present to the extent of at least 85%. The monomer selected from those described above is present to the extent of 2% to 14% and the sulfonate monomer of my invention is present to the extent of about 0.1% to 10.0%. In order to insure good basic dyeability the sulfonate monomer must be present in an amount sufficient to bring the total milliequivalent of combined sulfur, or sulfonic and sulfonate ionizable groups, per kilogram of polymer to at least 40 and preferably between 40 and 250.

The foregoing polymers may be converted to shaped articles, e.g., fibers or films, by dissolving them in dimethylformamide or other suitable solvent for polymers of high acrylonitrile content and spinning by evaporation of the solvent. The resulting shaped articles may be washed in hot or cold water to remove residual solvent, drawn two to ten times their original length and relaxed as desired, in the neighborhood of from 10% to 20%. This may be done using known apparatus, e.g., on filament yarn equipment, using steam under pressure or, alternatively, the articles may be washed and drawn simultaneously in hot water.

As previously indicated, the monomers of my invention may be advantageously used in the preparation of copolymers containing at least 85% of acrylonitrile to impart dyeability to textile fibers spun from such polymers. Likewise, they may be used to incorporate dye sites into textile fibers based on other vinyl monomers. Similarly, they may be incorporated into vinyl films and vinyl plastics where dyeability of the films or plastics is a requirement.

The dye sites of these monomers may also be incorporated in textile fibers, films, or resins by homopolymerizing the monomers and adding the resulting polymers to spinning solutions or melts before spinning.

My new monomers are also useful for the preparation of polymers and copolymers of such widely diverse purposes as anti-static agents, ion-exchange resins, and soil conditioners.

In addition to uses as monomers for the production of synthetic polymers, the compounds which are the subject of my invention also have utility as chemical intermediates and in the production of synthetic organic compounds in the fields of dyes, pharmaceuticals, and agricultural chemicals.

The most striking advantage of the class of monomers of the present invention over other available monomers containing sulfonic acid or sulfonate salt groups lies in the relative reactivity of these monomers compared to other monomers with which they may be copolymerized. Thus, when it is desired to add sulfonate groups to an acrylonitrile polymer, a monomer may be chosen from the class which I have invented which has the same polymerization rate in the solvent medium as that of acrylonitrile. The resulting product will thus have a ratio of sulfonate groups to acrylonitrile monomer units which is the same as the ratio of the two monomers in the feed. This is, of course, of great economic importance since a smaller amount of material is required initially and the amount of reaction by-product is substantially reduced. In the case of batch polymerizations, this results in uniformity of polymer from the start to the completion of the reaction. In the case of polymers made in a continuous system, this results in uniformity of the product coming from the reactor as a function of time. As a result, the fibers of the present invention not only have a high dyeability but also are of exceptionally uniform quality and therefore accept dyes uniformly.

It will be apparent that many widely different embodiments of this invention may be made without departing from the spirit and scope thereof, and therefore it is not intended to be limited except as indicated in the appended claims.

I claim:

1. As a new composition of matter, a polymerizable sulfonated vinyl monomer having the formula

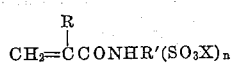

wherein R is selected from the group consisting of hydrogen, halogen, nitrile, and an alkyl radical containing from 1 to 4 carbon atoms, R' is an aromatic hydrocarbon radical, X is a monovalent cation selected from the group consisting of hydrogen, ammonium, an organic amine and an alkali metal, and $n$ is an integer from 1 to 3.

2. A composition according to claim 1 wherein R is methyl, R' is phenylene, and $n$ is 1.

3. A composition according to claim 1 wherein R is hydrogen, R' is phenylene, and $n$ is 1.

4. A composition according to claim 1 wherein the ratio of carbon atoms to sulfonate groups is at least 8 to 1.

5. A synthetic polymer comprised of acrylonitrile and a polymerizable sulfonated vinyl monomer having the formula

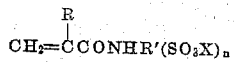

$$CH_2 = \overset{R}{\underset{|}{C}} CONHR'(SO_3X)_n$$

wherein R is selected from the group consisting of hydrogen, halogen, nitrile, and an alkyl radical containing from 1 to 4 carbon atoms, R' is an aromatic radical having at least 2 carbon atoms separating the nitrogen and sulfur of the acrylamido and sulfonate groups, X is a monovalent cation selected from the group consisting of hydrogen, ammonium, an organic amine and an alkali metal, and $n$ is an integer from 1 to 3, said sulfonated vinyl monomer being present in said polymer in copolymerized form in an amount from about 0.1% to about 10%.

6. The product of claim 5 wherein from about 2% to 14% of a non-ionic copolymerizable ethylenically unsaturated monomer and from about 0.3% to about 6.0% of said sulfonated monomer are present in copolymerized form in said polymer.

7. The product of claim 6 wherein said sulfonated monomer is p-acrylamidobenzenesulfonate.

8. The product of claim 6 wherein said sulfonated monomer is p-methacrylamidobenzenesulfonate.

9. The product of claim 6 wherein the ratio of carbon atoms to sulfonate groups in said sulfonated monomer is at least 8 to 1.

10. The product of claim 6 wherein said ethylenically unsaturated monomer is methyl acrylate.

11. The copolymer of claim 5 in the form of a filament.

12. The copolymer of claim 6 in the form of a filament.

13. The copolymer of claim 5 in the form of a film.

14. The copolymer of claim 6 in the form of a film.

References Cited in the file of this patent

UNITED STATES PATENTS

| | | |
|---|---|---|
| 2,723,254 | Chaney | Nov. 8, 1955 |
| 2,837,501 | Millhiser | June 3, 1958 |

FOREIGN PATENTS

| | | |
|---|---|---|
| 404,109 | Italy | May 21, 1943 |